United States Patent [19]

Burandt

[11] Patent Number: 4,724,809
[45] Date of Patent: Feb. 16, 1988

[54] METHOD AND APPARATUS UTILIZING VALVE THROTTLING AND CHARGE STRATIFICATION IN THE OPERATION OF AN INTERNAL COMBUSTION ENGINE

[75] Inventor: Corliss O. Burandt, Plymouth, Minn.

[73] Assignee: Investment Rarities Incorporated, Minneapolis, Minn.

[21] Appl. No.: 622,038

[22] Filed: Jun. 22, 1984

[51] Int. Cl.⁴ .............................................. F02B 17/00
[52] U.S. Cl. ................................. 123/430; 123/90.16; 123/306; 123/188 S
[58] Field of Search ..................... 123/90.16, 306, 430, 123/568, 432, 188 S, 188 M, 188 VA, 316

[56] References Cited

U.S. PATENT DOCUMENTS

| 1,733,696 | 10/1924 | Ricardo | 123/306 |
| 1,897,293 | 2/1933 | Bailey | 123/306 |
| 3,318,292 | 5/1967 | Hidig | 123/306 X |
| 3,714,932 | 2/1973 | Meacham et al. | 123/316 |
| 3,762,381 | 10/1973 | Dave | 123/188.5 X |
| 4,078,530 | 3/1978 | Okabe et al. | 123/306 X |
| 4,224,918 | 9/1980 | Tanaka et al. | 123/188 M X |
| 4,285,310 | 8/1981 | Takizaum et al. | 123/432 X |
| 4,357,917 | 11/1982 | Aoyama | 123/90.16 |
| 4,462,353 | 7/1984 | Arai et al. | 123/90.16 X |
| 4,469,062 | 7/1984 | Skegami et al. | 123/306 |
| 4,567,861 | 2/1986 | Hara et al. | 123/90.16 |
| 4,574,754 | 3/1986 | Rhoades, Jr. | 123/188 VA |

FOREIGN PATENT DOCUMENTS

28824 2/1982 Japan ................................. 123/306

Primary Examiner—Michael Koczo
Assistant Examiner—Peggy Neils
Attorney, Agent, or Firm—Peterson, Wicks, Nemer & Kamrath

[57] ABSTRACT

Intake valve throttling is employed to limit the lift or opening of an intake valve to a relatively small opening during light engine loads. A generally cylindrical shroud projects into the combustion chamber, the shroud having a gap facing in the direction of the spark plug, so that a desired amount of stratification of the incoming charge is achieved during light engine loads. Opening and closing of the exhaust valve are correlated with the actuation of the intake valve in order to obtain certain results, including better combustion with a concomitant decrease in the amount of pollution.

10 Claims, 12 Drawing Figures

METHOD AND APPARATUS UTILIZING VALVE THROTTLING AND CHARGE STRATIFICATION IN THE OPERATION OF AN INTERNAL COMBUSTION ENGINE

CROSS-REFERENCE TO RELATED APPLICATION

My copending application title "MECHANISM UTILIZING A SINGLE ROCKER ARM FOR CONTROLLING AN INTERNAL COMBUSTION ENGINE VALVE", Ser. No. 622,039 filed on June 2, 1984, now abandoned contains subject matter generally related to this application, said application, Ser. No. 622,039 filed on June 22, 1984 being a continuation-in-part of Ser. No. 491,819, filed May 5, 1983 (now U.S. Pat. No. 4,495,902, issued on Jan. 29, 1985) for "MECHANISM FOR VARIABLY CONTROLLING AN INTERNAL COMBUSTION ENGINE VALVE."

BACKGROUND OF THE INVENTION

1. Field of the Invention

This invention relates generally to internal combustion engines, and pertains more particularly to a method and apparatus for controlling the operation of an internal combustion engine by means of valve throttling and charge stratification.

2. Description of tne Prior Art

A large number of patents have been obtained that involve stratification, the goal being to obtain improved combustion and better engine efficiency. Of course, better combustion results in a reduced amount of pollution.

U.S. Pat. No. 3,762,381, issued on Oct. 2, 1973 to Sharad M. Dave for "VARIABLE INTERNAL COMBUSTION ENGINE VALVE OPERATING SYSTEM" has dealt with efficiency and combustion problems. However, the patented system is relatively complex and involves movable components that are subjected to elevated temperatures.

Another patent that has been granted that involves stratification with the sought after better combustion, along with an improved control of exhaust gases, is U.S. Pat. No. 3,980,060, granted on Sept. 14, 1976 to Masaaki Noguchi et al for "INTERNAL COMBUSTION ENGINE." Here again, the stratification involves the utilization of movable parts that are vulnerable to possible malfunction and an accompanying loss of the results that are desired.

As already indicated, numerous patents have been issued in the general area involving stratification. Nonetheless, there still remains a need for achieving an optimized reduction of exhaust gas emissions and an overall improved internal combustion engine efficiency.

SUMMARY OF THE INVENTION

A general object of my invention is to provide an enhanced delivery of an air/fuel mixture into an internal combustion engine at relatively light loads. In this regard, an aim of the invention is to provide a method and apparatus for stratifying the mixture in a highly effective manner by employing intake valve throttling and at the same time utilizing stratification of the air/fuel mixture during idling and when the engine is under a relatively light load. In addition, the invention makes use of an arrangement whereby the stratified mixture is directed toward the combustion chamber's spark plug, effectively doing so during relatively small openings of the intake valve when the engine is operating under a light load condition so that the fuel delivery is highly atomized and concentrated in the region nearest the area where the ignition occurs during such a light load condition.

A more specific object of the invention is to improve the exhaust gas recirculation (EGR) in an internal combustion engine. In this regard, an aim of the invention is to provide for a variable rate of internal recirculation of exhaust gases in contradistinction to the widely employed external recirculation of exhaust gases currently resorted to.

In the furtherance of the above objects, it is within the contemplation of my invention to entrap some of the exhaust gases by closing the exhaust valve prior to top dead center of the piston during idling and under light engine loads so that a significant percentage of the hydrocarbons remaining in the trapped exhaust gases will be internally recirculated so as to be burned with the incoming stratified air/fuel charge, this being exceedingly important in achieving a more complete combustion under light engine load conditions. Stated even more specifically, it is within the purview of the invention to recompress some of the exhaust gases retained in the combustion chamber toward the end of the piston's exhaust stroke so that the gases are maintained at a desirably elevated temperature during throttled operating conditions.

Still another object of the invention is to delay the introduction of the air/fuel mixture into the combustion engine during the usual intake stroke and even postponing the introduction of the air/fuel mixture until a period during the first half of the compression stroke. This has the desirable effect of reducing the time interval between the actual induction of the highly atomized charge and the ignition thereof at a light operating condition.

One stratification method in the past has involved a swirl process that has worked quite well under moderate engine load conditions but under heavier load conditions, especially at wide open throttle, the stratification process usually interferes with the volumetric efficiency of the engine. An aim of my invention is to provide a system in which the stratification and accompanying atomization are extremely beneficial and effective at light loads or idle conditions and in which the volumetric efficiency is considerably increased under heavier or wide open throttle conditions attributable to the high performance events obtainable with a variable valve controlling mechanism.

Still another object is to provide a method and apparatus for controlling the operation of an internal combustion engine in which cold weather starting is vastly improved.

An overall goal of my invention is, thus, to provide simple apparatus for obtaining an effective internal recirculation of exhaust gases, a recirculation devoid of any additional moving parts over and above those normally employed in the controlling of conventional valve actuating mechanisms.

Briefly, my invention involves the utilization of intake valve throttling, together with an effective stratification of the charge during a comparatively small opening or lift of the intake valve of an internal combustion engine. In this regard, it is intended that a single rocker arm be utilized and that the valve be only partially opened under idle or light load conditions in contradistinction to the usual engine in which the valve is opened fully irrespective of the engine's load.

It is also planned that the stratified and highly atomized air/fuel mixture resulting from the limited opening of the intake valve be directed generally toward the spark plug. This is realized by employing a generally cylindrical shroud that extends into the combustion engine to an extent sufficient to produce a desired amount of stratification for a lesser initial opening of the valve. While the shroud is generally cylindrical, a portion of the cylinder head forming the shroud is relieved or grooved to form a gap adjacent the side of the valve seat closest to the spark plug. After the valve has opened farther, that is, past the shroud, then the air/fuel mixture is allowed to disperse into the combustion chamber throughout virtually a complete circle. During the initial opening of the valve only an arc of approximately 20° is subtended, the precise angle depending on the arcuate gap in the generally cylindrical shroud. Additionally, it is envisaged that the opening of the intake valve be delayed to a later point during the intake stroke, or even postponed from the intake or suction stroke in which it is normally opened to some point in the first half of the combustion stroke. The goal is to reduce appreciably the interval of time between the moment at which atomization takes place and the ignition of the atomized charge. It is also intended that the exhaust valve associated with the combustion chamber be opened during a certain portion of the exhaust stroke and closed during other portions, especially during the portion as the piston nears top dead center, so that the exhaust end gases are trapped and the combustibles remaining therein effectively burned when the incoming stratified charge is ignited.

DESCRIPTION OF THE PREFERRED EMBODIMENT

With reference to the drawings, a conventional internal combustion engine 10 has been fragmentarily illustrated. The engine 10 includes an engine block 12 containing a number of combustion cylinders or chambers 14 therein, only the upper portion of one such chamber 14 appearing in FIGS. 2 and 3. Reciprocably disposed within the combustion chamber 14 is a piston 16. Being conventional, it is not thought necessary to illustrate the piston rod or the crankshaft. Overlying the cylinder block 12, however, and secured thereto is a cylinder head 18.

Included in the engine block 12 is a valve port 20 formed in the lower side of the cylinder head 18 by reason of a downwardly facing beveled seat 22. The valve port 20 constitutes an intake opening, a passage 24 extending to the opening or port 20 from the intake manifold (not shown) of the engine 10.

There is a reciprocable intake valve 26 having a valve head 28 at its lower end, the valve head 28 being beveled at 30 so as to seat against the beveled seat 22. The valve 26 additionally includes a valve stem 32 extending upwardly from the head 28.

A coil spring 34 encircles the upper portion of the valve stem 32, the lower end of this spring 34 bearing against the cylinder head 18. Located at the upper end of the stem 32 is a spring retainer denoted generally by the reference numeral 36 which retainer 36 is more fully described in my said copending application, Ser. No. 622,039 filed on June 22, 1984.

The engine 10 additionally includes a camshaft 38 journaled for rotation in two bearing blocks 40. The bearing blocks 40 are mounted on an overlying base plate 42 by means of bolts 44, the base plate 42 being attached to the head 18 by means of additional bolts 46. The camshaft 38, it will be understood, is driven by the crankshaft (not illustrated) of the engine 10. The camshaft 38 is driven at half the rotative speed of the undisclosed crankshaft.

Figure 6:
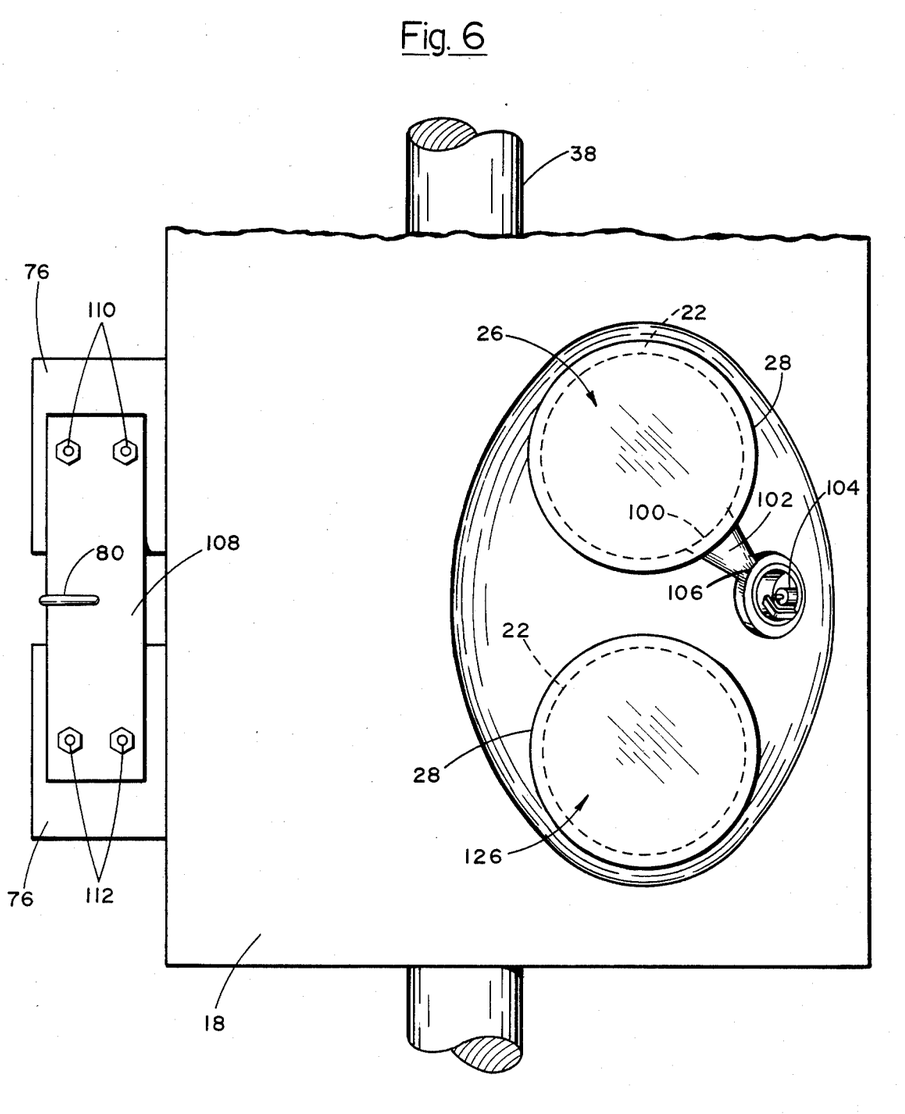
FIG. 6 is a plan view looking up in the direction of line 6113 6 of FIG. 2, the view showing the physical relation between the intake valve, the exhaust valve and the spark plug.

Each cylinder or combustion chamber 14 also has an exhaust valve 48 associated therewith, the exhaust valve 48 48 associated therewith, the exhaust valve 48 being visible in FIG. 6.

The valve throttling control mechanism for actuating the intake valve 26 has been denoted generally by the reference numeral 50. Included in the mechanism 50 is a cam unit or cam assembly indicated generally by the reference numeral 52 and which is more fully described in my said copending application, Ser. No. 622,039 filed on June 22, 1984. It will, however, be well at this time to mention several of the cam components belonging to the unit 52. In this regard, the cam unit 52 includes a central or main cam 54 and a pair of flanking cams 56, only one such flanking cam 56 appearing in FIGS. 2 and 3.

The mechanism 50 further includes an L-shaped rocker arm 58 having a substantially vertical leg 60 and a substantially horizontal leg 62. The rocker arm 58 is mounted for pivotal rocking movement on a pin 64.

Referring in greater detail to the vertical leg 60 of the rocker arm 58, it is to be explained that the vertical leg 60 has a cam follower surface denoted generally by the reference numeral 66. The cam follower surface 66 appears only in phantom outline, but is more fully described in my said copending application. All that need be appreciated at this time is that the central cam 54 acts against the portion labeled 68 of the cam follower surface 66 to rock the rocker arm 58. Inasmuch as there are two flanking cams 56, there are two flanking portions 70 of the cam follower surface 66, one at each side of the follower surface portion 68.

Regarding the horizontal leg 62 of the rocker arm 58, it is considerably simpler in shape than the vertical leg 60. The horizontal leg 62 is actually curved or arched to provide clearance with respect to a shaft 72. Although an adjusting device indicated generally by the reference numeral 74 acts against the upper end of the valve stem 32, it is not essential that the device 74 be fully described herein, especially since it is more completely referred to in my copending application. It can be pointed out in passing, though, that the device 74 enables the lash to be adjusted.

Figure 2:
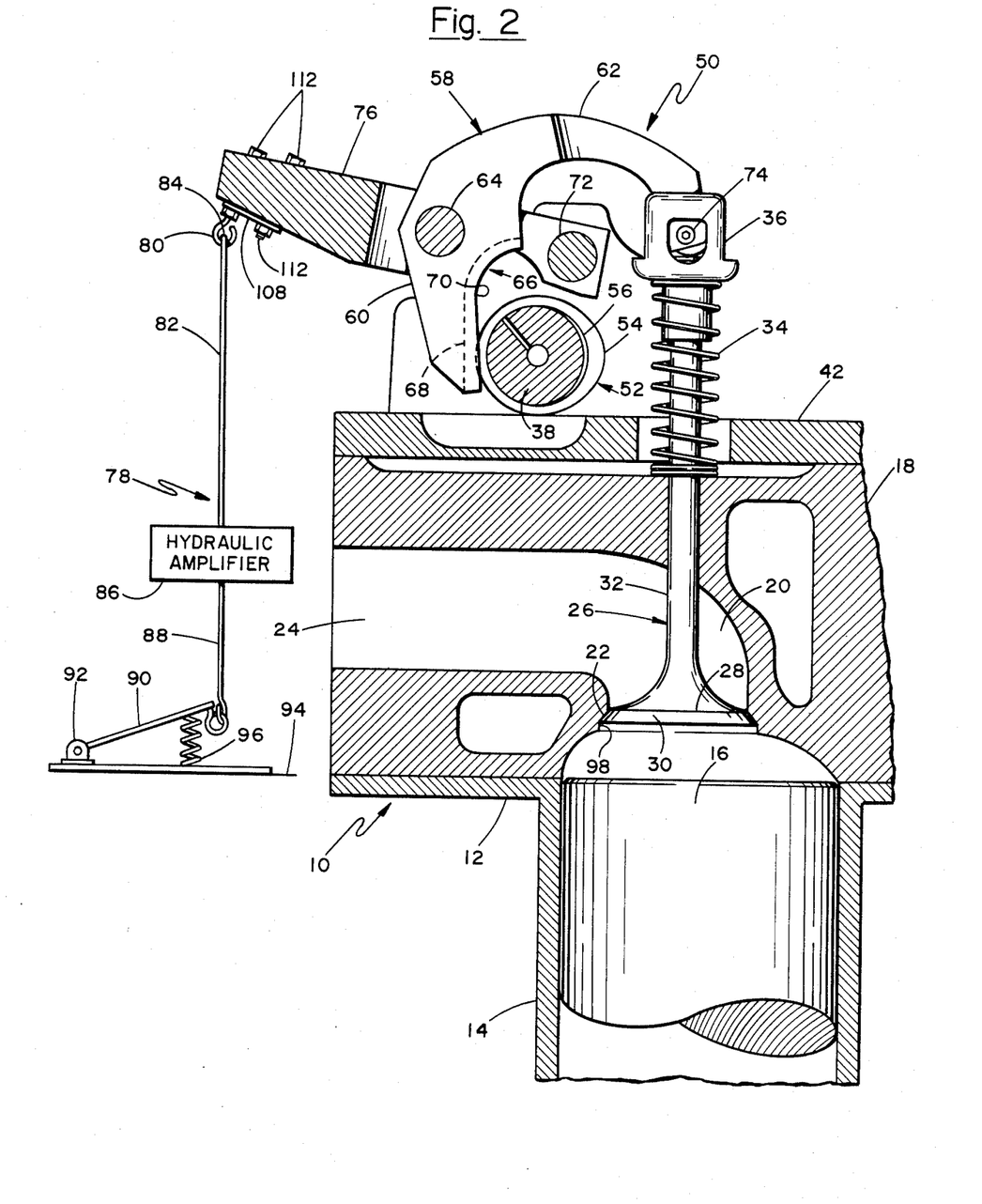
FIG. 2 is a vertical sectional view taken in the direction of line 2—2 of FIG. 1 in order to illustrate apparatus for controlling the opening and closing of the intake valve of FIG. 1, the view depicting the intake valve in its closed or seated relation.
Figure 3:
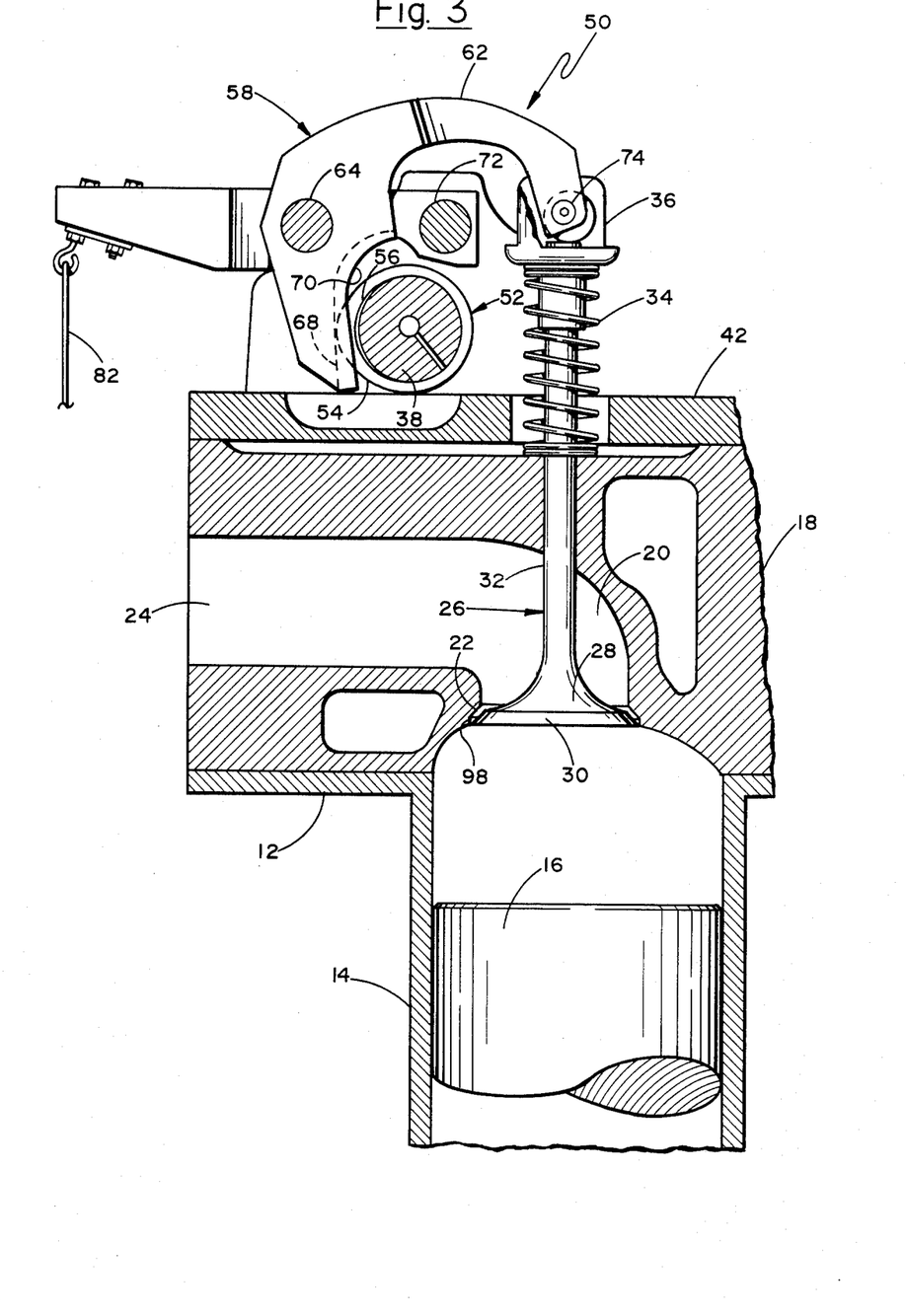
FIG. 3 is a vertical sectional view corresponding to FIG. 2 but with the intake valve partially open so as to stratify the air/fuel mixture being introduced into the combustion chamber.

At this time, attention is directed to the presence of a lever arm 76, the lever arm 76 supporting the rocker arm 58 by means of the pin 64 for rocking movement so that the device 74 on the free end of the horizontal leg 62 acts against the upper end of the valve stem 32 to open the valve 26 when the rocker arm 58 is rocked in a clockwise direction as viewed in FIGS. 2 and 3. It should be noted, though, that when the lever arm 76 is actuated in a counterclockwise direction, also as viewed in FIGS. 2 and 3, the vertical leg 60 of the rocker arm 58 is moved downwardly so as to present various sections of the portions 68, 70 constituting the cam follower surface 66 to the cams 54, 56 of the cam unit 52.

Although other devices can be employed, a device indicated generally by the reference numeral 78 is employed for positioning the lever arm 76, and in turn to position the vertical leg 60 of the rocker arm 58, to produce an optimum relation with the cam unit 52 so that the cam unit 52 acts on the most appropriate portion of the cam follower surface 66 for the particular load to which the engine 10 is subjected. As the description progresses, it will become manifest that the present invention is primarily concerned with only a partial opening or restricted lift of the intake valve 26. The device 78 illustratively includes an eyebolt 80 threaded upwardly into the left end of the lever arm 76, as viewed in FIG. 2. A vertical rod 82 extends downwardly from the eyebolt 80, the rod 82 having a hook 84 at its upper end that engages the eye of the eyebolt 80. A hydraulic amplifier or servomechanism 86, through a link 88, augments the foot force applied to an accelerator pedal 90. The accelerator pedal 90 is pivotally mounted at 92 to the floorboard 94 of the vehicle having the engine 10 therein, a spring 96 biasing the pedal 90 upwardly and away from the floorboard 94. What should be recognized, however, is that the device 78 controls the opening and closing of the valve 26 in accordance with the load to which the engine 10 is to be subjected at any given moment. A more elaborate and complex servomechanism might very well be utilized in actual practice, one automatically responding to, say, engine speed. Nonetheless, in order to illustrate the invention, the simplified device 78 is believed adequate.

The mechanism 50, it is to be understood, constitutes an intake valve throttling device. Hence, the valve 26 by reason of the control mechanism 50 opens the valve 26 to obtain a lift or valve opening that is commensurate with the load imposed on the engine 10. Stated somewhat differently, when the engine 10 is being throttled or under only a light load, then the valve 26 is opened only slightly—not fully as is customary.

In order to obtain the desired stratification of the air/fuel mixture being introduced into the combustion chamber 14 of the engine 10, a generally cylindrical shroud 98 is employed, the shroud 98 extending vertically downwardly from the lower edge of the beveled valve seat 22. The vertical length of the shroud 98 is subject to some variation. As the description progresses, it will become more apparent that the length should not exceed 25 percent of the full lift or opening of the valve 26, a 20 percent limitation being desirable in a number of instances. In other words, for a 0.500 inch lift, the shroud 98 should preferably extend downwardly from the lower edge of the seat 22 a distance not more than 0.125 inch. For a 0.400 inch lift, the maximum distance should, as a practical matter, be 0.100 inch.

From FIGS. 2 and 3, it will be observed that the shroud 98 constitutes a cylindrical wall or bore. However, the shroud 98 is only generally cylindrical, for a gap is formed at 100 which appears in FIGS. 4–6. The gap 100 forms what might be termed an entrance for a groove 102 extending radially toward ignition means in the form of a spark plug 104, the exit end of the groove 102 adjacent the spark plug 104 being labeled 106. The groove 102 is tapered, as can be perceived from FIG. 6, becoming narrower in the direction from the gap or entrance 100 to the exit or discharge end 106. The groove 102 subtends an arc or angle of approximately 30° at its wide end, that is, at the gap 100, and approximately 15° at its narrow end, that is at its exit 106. Thus, during the early or initial opening of the valve 26, the only real route that the incoming air/fuel mixture can travel is in the direction of the spark plug 104.

Figure 4:
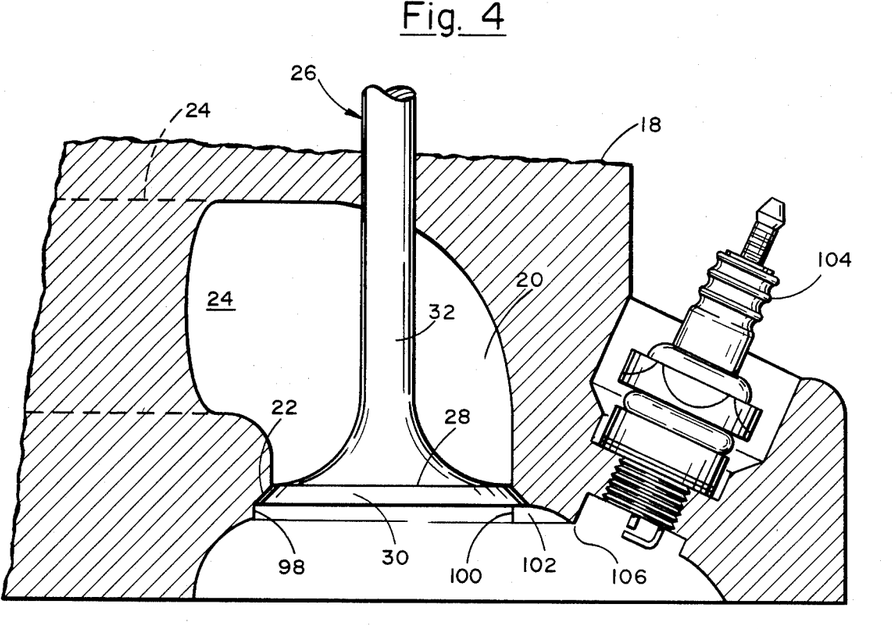
FIG. 4 is an enlarged sectional view taken in the direction of line 4—4 of FIG. 1 for the purpose of showing the intake valve, the generally cylindrical shroud and the gap or groove therein for directing the air/fuel mixture toward the spark plug, the valve being closed.
Figure 5:
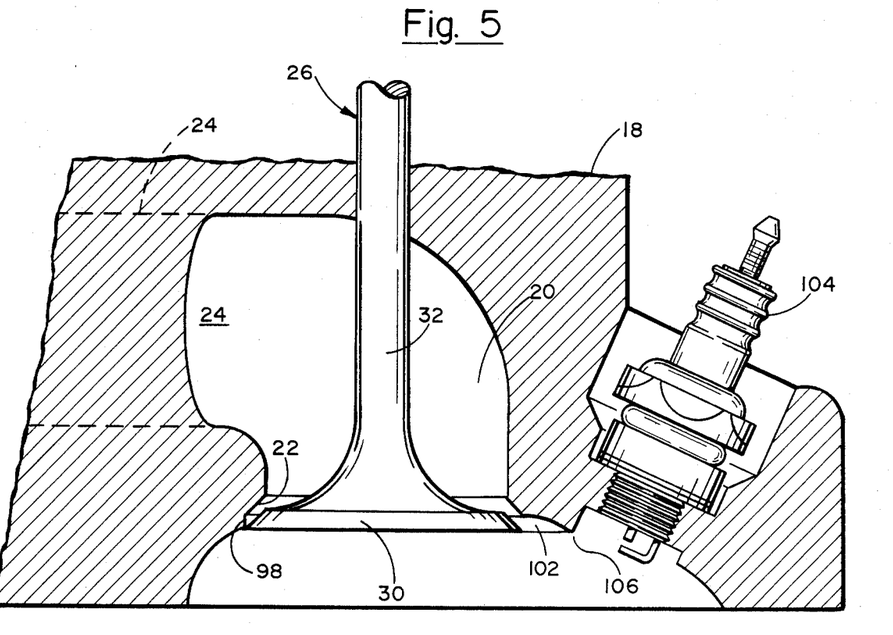
FIG. 5 is a view similar to FIG. 4 but depicting the valve in a partially open condition corresponding to the amount of valve lift shown in FIG. 3, such condition directing the stratified charge toward the spark plug.

Whereas FIGS. 2 and 4 show the valve 26 closed, FIGS. 3 and 5 depict the valve partially open so that the incoming air/fuel charge is constrained to flow toward the spark plug 104 and not in a general direction or throughout 360°. More specifically, the air/fuel mixture is constrained to flow through an angle subtending approximating 20°. However, after the valve head 28 moves downwardly beyond the lower edge of the generally cylindrical shroud 98, then the incoming air/fuel charge is dispersed throughout virtually an entire 360° or complete circle. In other words, it is only during the initial and limited opening of the valve 26 that stratification occurs, and it is during this period that the stratified charge is directed toward the spark plug 104. It is not believed necessary to show an opening of the valve 26 beyond that depicted in FIGS. 3 and 5. Unlike prior art control mechanisms, though, the use of intake valve throttling, as derived from the mechanism 50, limits the movement or opening of the valve 26 during an idling or light load condition imposed upon the engine 10, which is important when practicing my invention, for if the valve lift or opening always reached its maximum, previously mentioned as being on the order of from 0.400 to 0.500 inch, the stratification interval would be followed by an extensive non-stratification period each time the valve 26 opened. With the mechanism 50, though, if there is a throttling or light load condition, the valve 26 does not move downwardly past the lower edge of the shroud 98. The restricted movement greatly increases the atomization efficiency at light loads.

Figure 1:
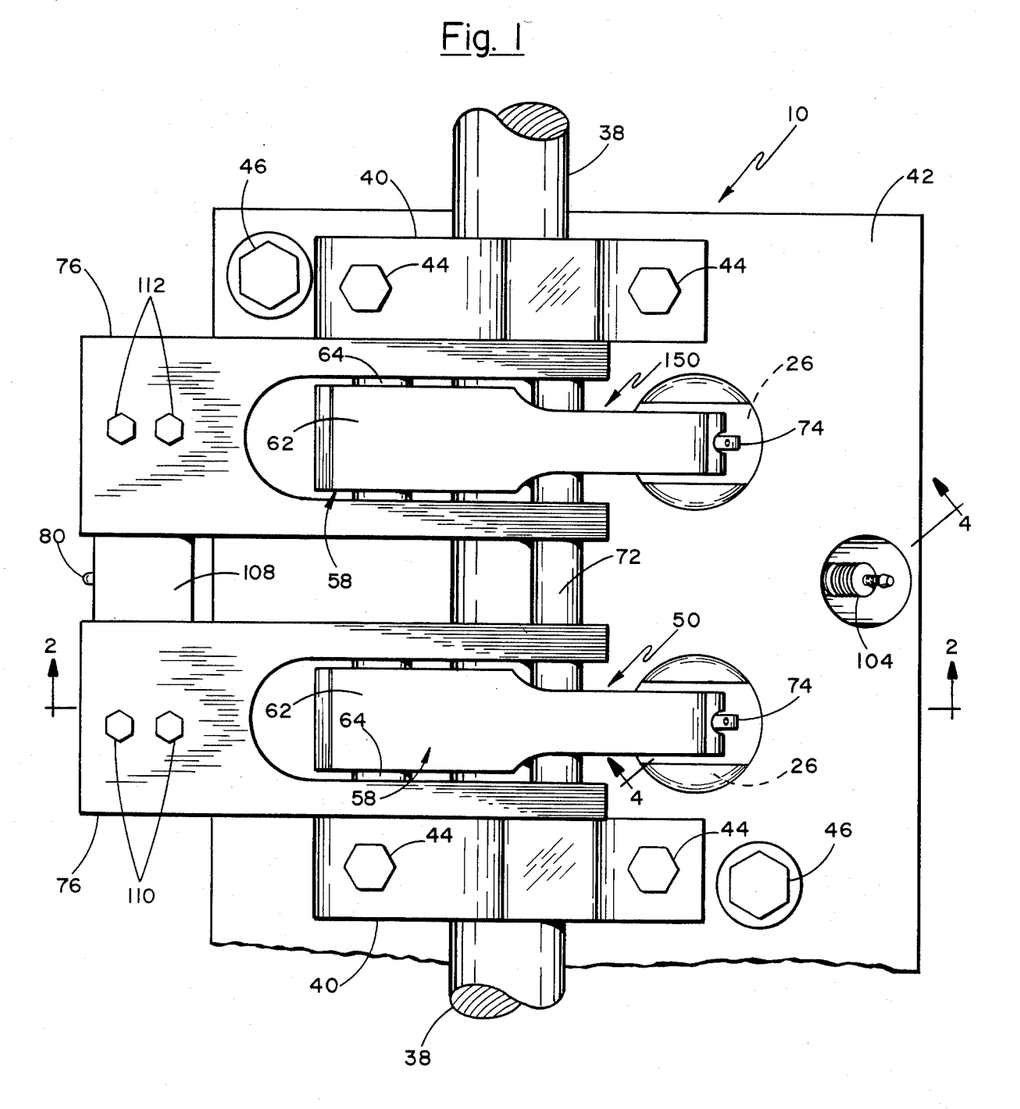
FIG. 1 is a top plan view of apparatus for opening and closing an intake and an exhaust valve of an internal combustion engine.

An exhaust valve 126 appears in FIG. 6 and is denoted in phantom outline in FIG. 1. It is opened and closed by a valve operating mechanism 150 that is basically the same as the mechanism 50 for the intake valve 26. Therefore, the corresponding parts carry the same reference numerals. What is not necessarily the same is the profile of the cam unit 52 (not visible) which contains cams profiled differently from the cams 54 and 56. Likewise, the cam follower surface 66 (also not visible) is not the same. Obviously, the phasing between the intake valve 26 opening and closing must be different from the opening and closing of the exhaust valve 126.

For the sake of simplification, the two valve controlling mechanisms 50 and 150 are mechanically connected by a tie bar or strip 108, the tie bar 108 being attached at one end to the lever arm 76 of the mechanism 50 by bolts 110 and attached at its other end to the lever arm 76 of the mechanism 150 by bolts 112. Thus, the mechanisms 50, 150 are operated in concert by the device 78. However, separate devices 78 could be utilized, and also separate camshafts 38. For example, the use of two camshafts can be used in order to derive the results graphically pictured in FIG. 9.

Figure 7A:
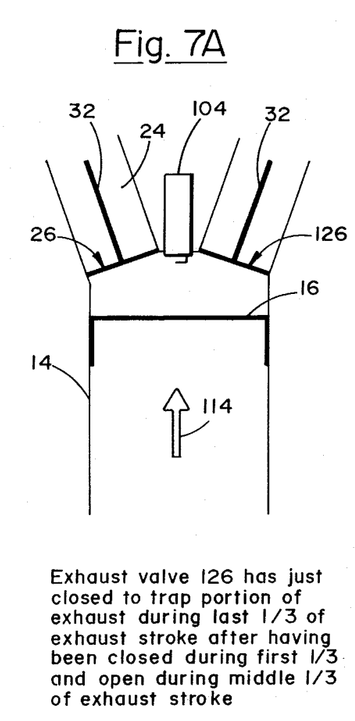
FIGS. 7A, 7B, 7C and 7D are schematic or diagrammatic views depicting a pattern of opening and closing the intake and exhaust valves in relation to piston movement.

With the appreciation in mind that various valve control patterns can be realized by modifying the cam and surface profiles, attention is now directed to FIGS. 7A, 7B, 7C and 7D which need only be diagrammatically presented. What transpires, as well as what can be achieved, will become even clearer when considering FIGS. 8 and 9. In FIG. 7A, the piston 16 is moving upwardly in the direction of the arrow 114, this being during the exhaust stroke. Both the intake valve 26 and the exhaust valve 126 are closed, however, at the depicted moment, which is as the piston 16 is approaching top dead center (TDC), having traveled upwardly an appreciable distance from bottom dead center (BDC). During the earlier portion of the exhaust stroke, the exhaust valve 126 was opened to rid the combustion of some of the exhaust gases. However, because my invention provides internal—exhaust gas recirculation, it is necessary to trap some of the end gases, which contain a higher concentration of combustible hydrocarbons therein. It should be borne in mind that the bulk of the hydrocarbon emissions are typically discharged during the last 10 percent of the exhaust stroke. From the ensuing description, it will become evident that my invention enables the combustibles to be effectively burned internally, thereby obviating the need for externally recirculating such gases as is now done.

Figure 7B:
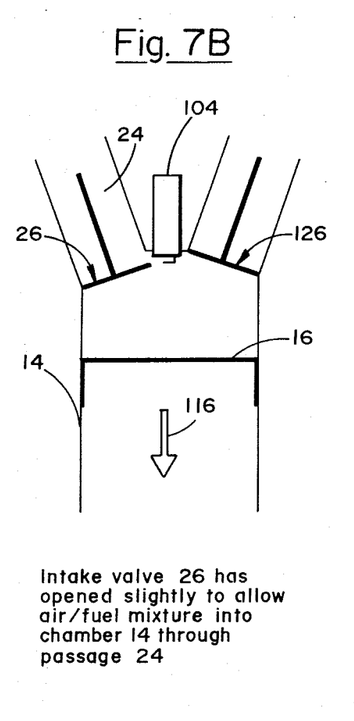

Turning now to FIG. 7B, the piston 16 is at this time traveling downwardly in the direction of the arrow 116 during an intake stroke. Consequently, the intake valve 26 is open, but only partially so. In this regard, it will be assumed that the engine 10 is under a light load. Hence, the control mechanism 50, as can be even better understood from FIGS. 3 and 5, has opened the valve 26 to only a limited degree—more precisely only to the extent that the lower edge of the beveled surface 30 is even with the lower edge of the shroud 98. This restricted valve opening exists in FIG. 7B. Thus, the valve 26 in FIG. 7B is opened only enough to allow a sufficient charge of air and fuel to flow via the groove 102 of FIGS. 4, 5 and 6 for the light load to which the engine 10 is subjected. The exhaust valve 126 is, of course, closed.

Figure 7C:
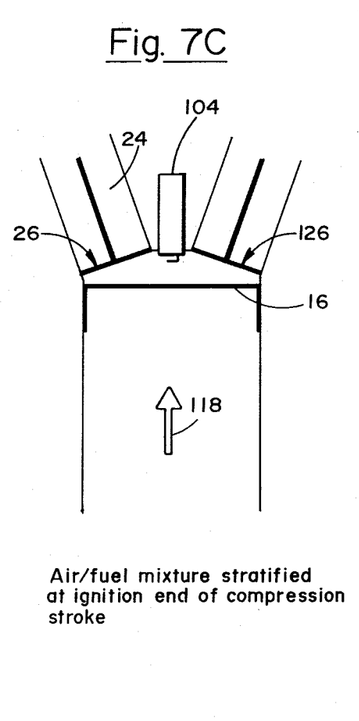

FIG. 7C depicts the stratified air/fuel mixture that has been inducted into the combustion chamber 14 in FIG. 7B to be compressed, the piston 16 moving upwardly in the direction of the arrow 118 to effect this compression. More specifically, FIG. 7C shows the ignition that takes place by reason of the spark plug 104 being energized at the end of the compression stroke. Both valves 26 and 126 are closed.

Figure 7D:
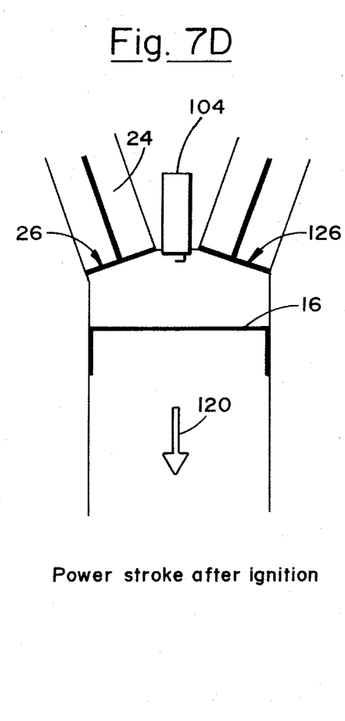

It is FIG. 7D that illustrates the power stroke, the piston 16 moving downwardly in the direction of the arrow 120. Both valves 26 and 126 are closed.

In summary, FIGS. 7A–7D demonstrate that when practicing the teachings of my invention a desired percentage of the exhaust gases can be trapped in the combustion chamber 14 (FIG. 7A) and mixed with the incoming stratified charge (FIG. 7B), thereby reducing pollution in that the combustibles retained in the chamber 14 are mixed with the incoming air/fuel and to a significant extent burned when the plug or ignition means 104 produces a spark.

Figure 8:
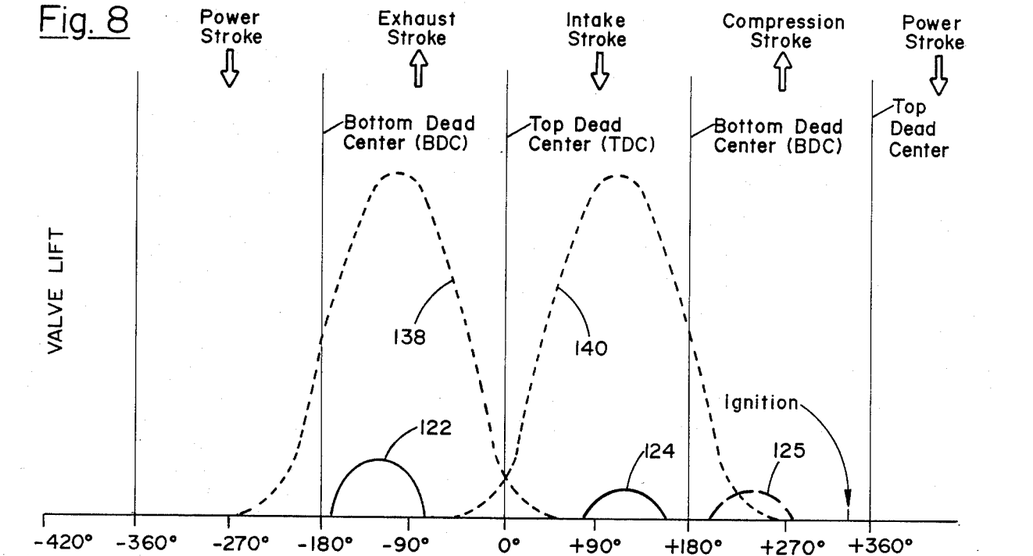
FIG. 8 constitutes a graph with valve lift or valve opening plotted against crankshaft rotation, the solid curves depicting the opening and closing, respectively, of the intake and exhaust valves when utilizing the mechanism of FIGS. 1-3, and the dotted curves depicting the opening and closing of conventional intake and exhaust valves.

The flexibility and versatility derivable from my invention can also be appreciated by considering FIG. 8 in which valve lift is plotted against crankshaft degrees. The curve representative of the opening and closing of the exhaust valve 126 has been assigned the reference numeral 122 and the curve representative of the opening and closing of the inlet valve 26 by the numeral 124. It should be observed from the curve 122 that the exhaust valve begins to open at about −185° and that it closes at about −60°, the point at which the piston 16 appears in FIG. 7A. It is, of course, the −60° closing point that entraps a percentage of the exhaust gases as explained when considering FIG. 7A.

The intake valve 26, as deduced from the curve 124, opens at approximately +70°, closing at approximately 160°. The +70° point corresponds generally to the physical relationship of the valve 26 and the piston 16 in FIG. 7B. Since the 0° point in FIG. 8 constitutes a top dead center (TDC) position of the piston 16, the delayed opening of the valve 26 (well into the intake stroke) is illustrated. This reduces the interval between the introduction of the stratified charge for an idle condition of the engine 10 and the moment of which a spark is furnished by the spark plug 104. The additional curve 125, composed of dashes, graphically illustrates even a greater postponement, as far as the opening of the inlet valve 26. The opening at about +185° and the closing at about +270°, as denoted by the curve 125, is during the first half of the compression stroke, it might be pointed out.

Figure 9:
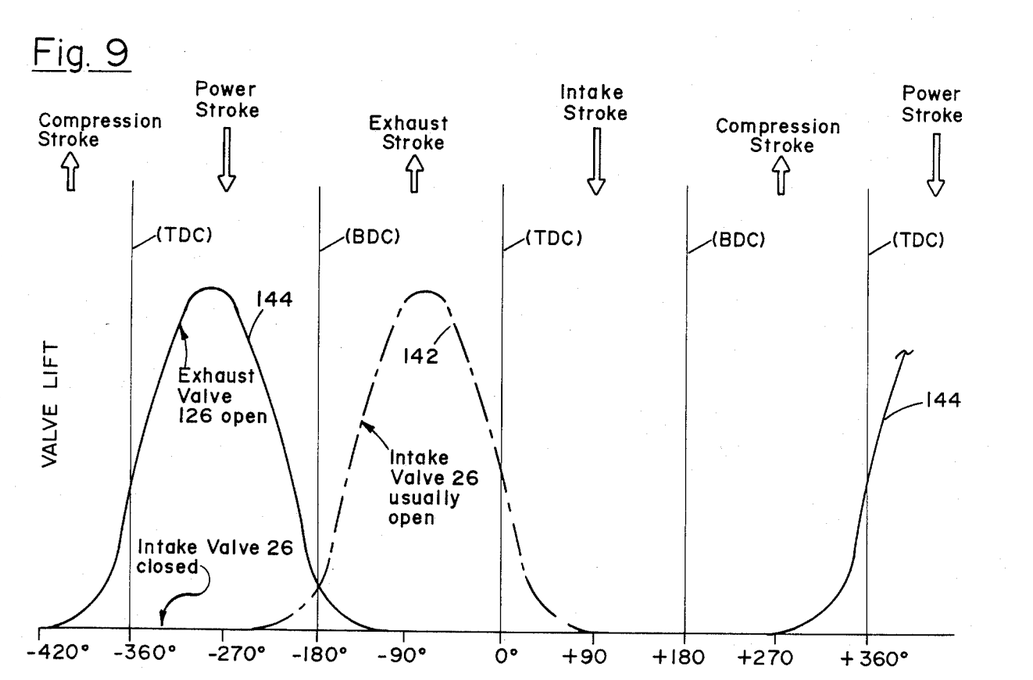
FIG. 9 is a graph showing a phasing relationship in which the opening of the exhaust valve is advanced so as to occur during the normally designated power stroke.

Without detailing the degrees at which the opening and closing of typical conventional or stock exhaust and intake valves, respectively, are concerned, it might be well to superimpose onto FIG. 8 dotted curves 138 and 140. Obviously, the exhaust curve 138 and the intake curve 140 represent situations involving no valve throttling, the particular exhaust and intake valves opening completely during each exhaust and each intake stroke It is easy to obtain a so-called Jake brake operation with my invention. The term "Jake brake" is synonomous with "engine brake" which refers to a change in valve timing which converts the engine into an inefficient air compressor during deceleration. In other words, as far as a Jake brake operation is concerned, a phase change of the camshaft relative to the crankshaft is effected so that the exhaust event occurs generally during the normally designated power stroke. This is done with the intake valve 26 rendered inoperable, so that it remains closed, or at least substantially closed. Therefore, the dotted curve 142 in FIG. 9 depicts the usual or stock event, as far as the opening and closing of the exhaust valve 126, whereas the solid curve 144 shows the shifted or advanced opening and closing of the valve 126. The stock exhaust opening and closing, as denoted by the curve 142, takes place between approximately −210° and +60°, and the corresponding Jake brake opening and closing takes place between approximately +240° and −160°.

The result, as far as the Jake brake mode of operation is concerned, is that whatever exhaust gases that have been earlier forced from the combustion chamber 14 into the exhaust passage leading to the exhaust manifold (neither the intake nor exhaust manifolds have been shown) is pulled back into the chamber 14 by the subatmospheric pressure created by the downwardly moving piston 16. At this time, the exhaust valve 126 is closed and the exhaust gases are compressed and subsequently released near top dead center of the compression stroke. The operation of the so-called Jake brake with respect to exhaust gases is considered to be advantageous since the noise associated with the pressure release is absorbed in the engine's exhaust system.

I claim:

1. A method of operating the intake valve associated with the combustion chamber of an internal combustion engine including a valve seat, a generally cylindrical shroud subtending substantially 360° and extending into said combustion chamber from said valve seat, the method comprising the steps of partially opening the intake valve at a point during the intake event period after the piston has passed top dead center, said shroud having a gap at only one angular location so that the partial opening of the intake valve introduces a stratified charge of air and fuel into the combustion chamber only via said gap during said partial opening of said intake valve, preventing said intake valve from moving beyond said shroud to maintain said partial opening during lighter engine loads, and moving said intake valve beyond said shroud during heavier engine loads so that a charge of air and fuel is introduced into the combustion chamber throughout said substantially 360°.

2. The method of claim 1 in which said combustion chamber includes a spark plug and said gap faces only toward said spark plug so that said stratified charge is introduced primarily toward said spark plug.

3. In an internal combustion engine, means forming a combustion chamber, a spark plug in said chamber, a piston disposed in said chamber for reciprocable movement toward and away from said spark plug, a valve member, circular seat means for said valve member, means for varying the lift of said valve member, a generally cylindrical shroud corresponding generally to the size of said seat means, said cylindrical shroud being relieved only in the direction of said spark plug so that, when said valve member is moved relative to said shroud by said lift-varying means, a stratified mixture of air and fuel is directed toward said spark plug until said lift-varying means causes said valve member to pass beyond said shroud so that during the initial lift of said valve member said stratified air and fuel mixture is directed solely toward said spark plug until said valve member passes beyond said shroud and the air and fuel mixture is directed generally through a 360° arc after said valve member passes beyond said shroud, and means limiting the lift of said valve member so that it does not pass said shroud during lighter loads, whereby said air and fuel mixture is directed primarily toward said spark plug until said valve member passes beyond said shroud.

4. The internal combustion engine of claim 3 in which the region between the relieved portion of said generally cylindrical shroud and said spark plug is formed by a groove in said shroud.

5. The internal combustion engine of claim 3 including an L-shaped rocker arm having one leg engaging said valve member and a second leg extending generally at right angles to said first leg, said second leg having a cam folower surface formed thereon, and a cam relatively engageable with various portions of said cam follower surface to cause said rocker arm to limit the lift of said valve member to less than the length of said shroud during lighter engine loads and to vary the lift of said valve member beyond said shroud in accordance with heavier engine loads.

6. A method of operating an internal combustion engine having a combustion chamber, a spark plug in said chamber, a piston disposed in said chamber for reciprocal movement toward and away from said spark plug, a valve member, circular seat means for said valve member, a generally cylindrical shroud corresponding generally to the size of said seat means, said cylindrical shroud being relieved only in the general direction of the said spark plug, the method comprising the steps of moving said valve member relative to said shroud, direction a mixture of air and fuel toward said spark plug until said valve member passes said shroud so that during the intial lift of said valve member a stratified air and fuel mixture is directed primarily toward said spark plug during a light load, limiting the lift of said valve member during a light load so that said valve member does not pass beyond said shrould, and directing a mixture of air and fuel through a 360° arc during a heavy load after said valve member passes beyond said shroud.

7. A method of operating an internal combustion engine having a combustion chamber, spark ignition means in said combustion chamber, a piston reciprocably disposed in said combustion chamber for movement toward and away from said spark ignition means, a valve member, a valve seat, and a generally cylindrical shroud extending from said seat a distance not more than 0.125 inch, said shroud constituting an arc of virtually 360° with the exception of a gap subtending approximately 20° of said arc said gap directing an air/fuel mixture toward said spark ignition means until the said valve member has moved 0.125 inch from said seat, the method comprising the step of limiting the opening of said valve member relative to said seat to approximately 0.500 inch.

8. An an internal combustion engine, means forming a combustion chamber, a spark plug in said chabmer, a piston disposed in said chamber for reciprocable stroke movement toward and away from said spark plug, a valve member, seat means for said valve member, means for varying the lift of said valve member with respect to said seat means between a closed condition and a full lift condition, and a generally cylindrical shroud extending from said seat means having a length not exceeding 25% of the full lift condition of said valve member, said shroud having a gap facing said spark plug, whereby an air/fuel mixture is directed primarily toward said spark plug when the lift of said valve member does not exceed 25% of its full lift condition.

9. In an internal combustion engine, means forming a combustion chamber including a valve seat, a valve member cooperable with said valve seat, a spark plug, a generally cylindrical shroud subtending substantially 360° and extending into said combustion chamber from said valve seat, said shroud having a gap therein at only one angular location, and means for varying the lift of said valve member so that air and fuel flow only through said gap until said valve member passes beyond said shroud and air and fuel flow through substantially said 360° after said valve member passes beyond said shroud, the concentration of the air and fuel progressively decreasing as said valve member moves farther from said shroud toward a maximum lift position.

10. The internal combustion engine of claim 9 in which said gap subtends an angle of approximately 20° and said gap is directed toward said spark plug.

* * * * *